(12) United States Patent
Van Zuylen

(10) Patent No.: US 7,213,365 B2
(45) Date of Patent: May 8, 2007

(54) DEVICE FOR ARRANGING A BUNCH OF FLOWERS

(76) Inventor: André Van Zuylen, Rijnstraat 132, NL-2223 EB Katwijk (NL)

( * ) Notice: Subject to any disclaimer, the term of this patent is extended or adjusted under 35 U.S.C. 154(b) by 54 days.

(21) Appl. No.: 10/495,389

(22) PCT Filed: Nov. 12, 2002

(86) PCT No.: PCT/NL02/00726

§ 371 (c)(1),
(2), (4) Date: Dec. 1, 2004

(87) PCT Pub. No.: WO03/041629

PCT Pub. Date: May 22, 2003

(65) Prior Publication Data

US 2005/0072044 A1    Apr. 7, 2005

(30) Foreign Application Priority Data

Nov. 12, 2001  (NL) .................................. 1019351

(51) Int. Cl.
*A01G 5/02* (2006.01)
*A47G 7/04* (2006.01)

(52) U.S. Cl. .................................................. 47/41.01
(58) Field of Classification Search ............... 47/41.11, 47/41.01, 41.12, 39, 41.13, 65, 41.15, 44, 47/45; 428/23, 27; 211/88.03, 85.23, 169.1, 211/181.1; 248/346.01, 346.07
See application file for complete search history.

(56) References Cited

U.S. PATENT DOCUMENTS

| | | | | |
|---|---|---|---|---|
| 2,126,766 A | * | 8/1938 | Gerbermann | 47/41.11 |
| 2,770,919 A | * | 11/1956 | Shumaker | 47/39 |
| 4,872,283 A | * | 10/1989 | Yinger | 47/70 |
| 4,964,237 A | | 10/1990 | Specht | |
| 5,490,350 A | * | 2/1996 | Eisenschenk et al. | 47/40.5 |

FOREIGN PATENT DOCUMENTS

| | | |
|---|---|---|
| JP | 11-103990 | 4/1999 |
| NL | 1018013 C2 * | 11/2002 |

* cited by examiner

*Primary Examiner*—Son T. Nguyen
(74) *Attorney, Agent, or Firm*—The Webb Law Firm

(57) ABSTRACT

The invention relates to a device for arranging a bunch of flowers, in particular a twisted bunch of flowers. The device comprises a top and a bottom grating, each having grating openings through which the stems of flowers/twigs can be inserted. The top grating is made up of two multiplicities of bars, each parallel to one another, at least one of the multiplicity of bars being able to be moved back and forth in the longitudinal direction thereof in order to be able to break the grating structure for removal of the bunch of flowers formed. The top and bottom gratings can be turned relative to one another about a vertical axis of rotation to twist the stems of a bunch of flowers placed therein.

18 Claims, 6 Drawing Sheets

DEVICE FOR ARRANGING A BUNCH OF FLOWERS

BACKGROUND OF THE INVENTION

1. Field of the Invention

The present invention relates to a flower arranging device for arranging a bunch of flowers.

2. Description of the Related Art

A device of this type is disclosed in JP-11/103990. This Japanese Patent Application discloses a block-shaped frame with a top grating and a bottom grating. In the embodiment according to FIG. 2 the top grating is made up of a first multiplicity of bars and a second multiplicity of bars. The first and second multiplicity of bars cross one another at an angle of 90°. The second multiplicity of bars is fixed in the frame and the first multiplicity of bars can be pulled/pushed away in the longitudinal direction of the bars of said first multiplicity, after which the top grating is open at one longitudinal end of the second multiplicity of bars in order to remove the bunch of flowers. The bottom grating is a fixed distance below the top grating and is fixed in the frame. According to an English abstract, this flower arranging device serves as aid for arranging a bunch of flowers. This flower arranging device is not very practical in use and is completely impractical in use when producing bunches/bouquets of flowers having stems which follow a sort of twist, so-called wheatsheaf-like bouquets.

SUMMARY OF THE INVENTION

The aim of the present invention is to provide a flower arranging device with which, in particular, bunches of flowers of a twisted type, that is to say wheatsheaf-like bunches of flowers, can be obtained.

According to the invention the abovementioned aim is achieved in that the bottom grating and top grating can be turned relative to one another about a vertical axis of rotation which intersects both gratings essentially centrally when the gratings are in the position located one above the other.

Because the bottom and top gratings can be turned relative to one another it is possible to insert the stems of the flowers (which stems in this application are also understood to be stems without flowers or twigs) through both gratings to pre-form a bunch (which term in this application also refers to a bouquet) and then to impart a wheatsheaf-like or twisted-type character to said bunch by turning the two gratings relative to one another. This turning will result in a sort of constriction of the stems at the level of the middle of said gratings, at the location of which constriction it is then possible to apply binding material in a closed loop around the bunch in order to hold the bunch together. Subsequently, the first multiplicity of bars can be pulled away and the wheatsheaf-like or twisted-type bunch (of flowers) formed can be removed from the flower arranging device.

To facilitate removal of the bunch from the flower arranging device it is advantageous according to the invention if the second multiplicity of bars can be moved back and forth in the direction of the second bar axes between, on the one hand, a grating position that intersects the first bar axes and, on the other hand, a release position located to the side of the first bar axes.

In order to facilitate insertion of the stems through both gratings, in particular the orientation during this insertion, it is highly advantageous according to the invention if the vertical distance between the bottom and the top grating is adjustable. By lowering only the bottom grating with this arrangement it is possible to keep the bunch level. By moving the bottom grating close to or in contact with the bottom of the top grating before positioning stems in the gratings, orientation of the stems through grating openings in both gratings is appreciably facilitated. When all stems have then been inserted in both gratings the vertical distance between the bottom and the top grating can be adjusted, in particular increased, before turning the gratings relative to one another. It should be clear that this mutual vertical adjustability of the gratings can also be used, as a supplement to easier insertion or completely separately therefrom, to facilitate removal of the bunch from the gratings; After all, by moving the bottom grating and top grating apart it is possible to free the bottom grating from the bunch.

With regard to the adjustability of the height of the bottom and the top grating with respect to one another, it is preferable according to the invention if the height of the bottom grating is adjustable along the axis of rotation. The vertical height of the top grating can then be located in a fixed position.

In order to provide the flowers/stems of a bunch to be formed with adequate lateral support (in the horizontal direction) when the bottom grating and top grating are in contact with one another or a relatively small vertical distance apart, it is preferable according to the invention if the flower arranging device has a support bracket, with two bracket arms, provided above the top grating, which bracket arms, viewed in projection on the plane of the top grating, essentially embrace the top grating or at least can be brought into a position embracing the top grating, viewed in projection in this way.

In order to facilitate removal, from the embracing support bracket, of a bunch that has been formed, it is advantageous with this arrangement if one or both bracket arms are flexible or able to swing in order to be able to move between said embracing position and a non-embracing position located to the outside.

According to the invention the provision of lateral support to the flowers/stems of a bunch to be formed when the bottom grating and top grating are in contact with one another or a relatively small vertical distance apart can, in particular, be improved if the flower arranging device has a support fork provided above the top grating, which support fork has parallel times which extend parallel to the top grating, the support fork being able to be moved back and forth in the longitudinal direction of the times between, on the one hand, a position overlapping the bottom and/or the top grating and, on the other hand, a release position located to the side of the bottom and/or the top grating. In this way the stems/flowers are held in an approximately upright position, essentially individually supported, or at least bordered by two parallel times located alongside one another. The support fork will, preferably before mutually turning the bottom and top gratings relative to one another, be retracted from the overlapping position by moving into a release position located to the side of the bottom and/or the top grating.

In this context it is preferable according to the invention if the vertical distance between the support fork and the top grating is adjustable. One advantage of this is, for example, that in the case of longer stems/taller bunches the support fork can be set higher to provide better lateral support for the stems/flowers. A further advantage is that the support fork can be lowered when the partially or completely finished bunch is lowered. In this context it is particularly advantageous according to the invention if the flower arranging device is equipped to reduce the vertical distance between the support fork and the top grating simultaneously with increasing the vertical distance between the bottom and the top grating. It will be clear to those skilled in the art that this can be achieved in a wide variety of diverse ways. It is possible, for example, to link the support fork to the bottom grating mechanically via a rod assembly so that, assuming that the top grating is at a fixed height, lowering the bottom grating will simultaneously lower the support fork. Such a mechanical coupling is, however, not absolutely essential. It is also possible to provide separate drives which are controlled by means of a control device to achieve simultaneous movement.

Although this is not absolutely essential, with a view to easily being able to orient the stems it is advantageous if the number of top grating openings is identical to the number of bottom grating openings and/or if the bottom and top grating openings are provided in accordance with the same pattern. With regard to the same pattern it is pointed out that this relates to the mutual arrangement of the grating openings and has nothing to do with the number or the size of the grating openings. It is, for example, conceivable that the bottom grating is smaller than the top grating but that the gratings have an identical number of grating openings which are positioned in accordance with an identical pattern. It is also conceivable that the bottom grating is larger than the top grating and that the numbers of grating openings in the two gratings are identical. Furthermore, it is certainly conceivable that, for example, the top grating has x smaller grating openings per grating of the bottom grating or vice versa. In this context x can be, for example, 2, 3, 4, 5, 6, 7, 8, 9 or 10. With a view to simple orientation, with this arrangement it will generally be the case that the top grating has smaller grating openings and x grating openings per grating opening in the bottom grating.

The ease of use of the flower arranging device can be increased by constructing the bottom and the top grating such that they each have a central grating opening, which central grating openings will then, in particular, be above one another. This provides the flower arranger with a possibility for working around a central reference stem. The various features can, for example, be achieved by providing the bottom and the top grating each with a five-by-five grating.

In order to be able to hold stems, which have been inserted through the two gratings, of a bunch to be formed in a fixed inserted position through the two gratings it is advantageous according to the invention if the bottom grating is provided with support means for stems to hold these fixed at a specific height. Such support means can, for example, comprise a plate arranged beneath the bottom grating. Such a plate has; however, the disadvantage that the stems then have to be cut to length in advance so that they all end up with their bottoms at the same height and it will be desirable that the crown of the bunch has a regular shape within certain limits. In this context it is furthermore preferable according to the invention if the support means comprise resistance means, such as brushes, leaf springs or sheet parts provided with slits, provided in the grating openings in the bottom grating, or at least surrounding the passages of said grating openings, which resistance means are able to grip laterally a stem inserted through the grating opening concerned. In this way it is possible to adjust the crowns of the flowers to the desired height when arranging and subsequently, if necessary, to trim the bottoms of the stems to the same level when the bunch has been formed. Sheet parts provided with slits, in particular made of rubbery material, are preferred here. The reason is that by this means a good grip can be obtained both with stiff/rigid and with weak/vulnerable stems, whilst damage to, in particular, vulnerable stems is counteracted.

For the purposes of binding it is preferable according to the invention if the flower arranging device further comprises binding means equipped to provide, somewhere between said gratings, around a bunch extending through the gratings, a closed loop of binding material running around the bunch. Binding materials which may be mentioned are, for example, elastic, string, tape and very particularly also so-called "tie raps". However, it is pointed out that it is also possible to use the flower arranging device next to a conventional binding device and to take the as it were twisted or wheatsheaf-like bunch formed out of the flower arranging device and then to bind it using a conventional binding device.

According to a further aspect, the present invention relates to the use of a flower arranging device according to the invention for the production of a twisted or wheatsheaf-like bunch of flowers.

According to yet a further aspect, the present invention relates to a method for arranging a bunch of flowers making use of the device according to the invention, comprising the following steps:

inserting flower and/or plant stems through grating openings located one above the other;

turning the bottom and top gratings relative to one another;

providing a closed loop of binding material running around the stems of the bunch between the bottom and the top grating, preferably at the midway point of the vertical distance between them;

moving the first multiplicity of bars of the top grating from the grating position into the release position and optionally moving the second multiplicity of bars of the top grating from the grating position into the release position; and removing the twisted bunch of flowers formed.

BRIEF DESCRIPTION OF THE DRAWINGS

The present invention will be explained in more detail below with reference to an illustrative embodiment shown diagrammatically in the drawing. In the drawing.

DESCRIPTION OF THE PREFERRED EMBODIMENTS

Figure 1:
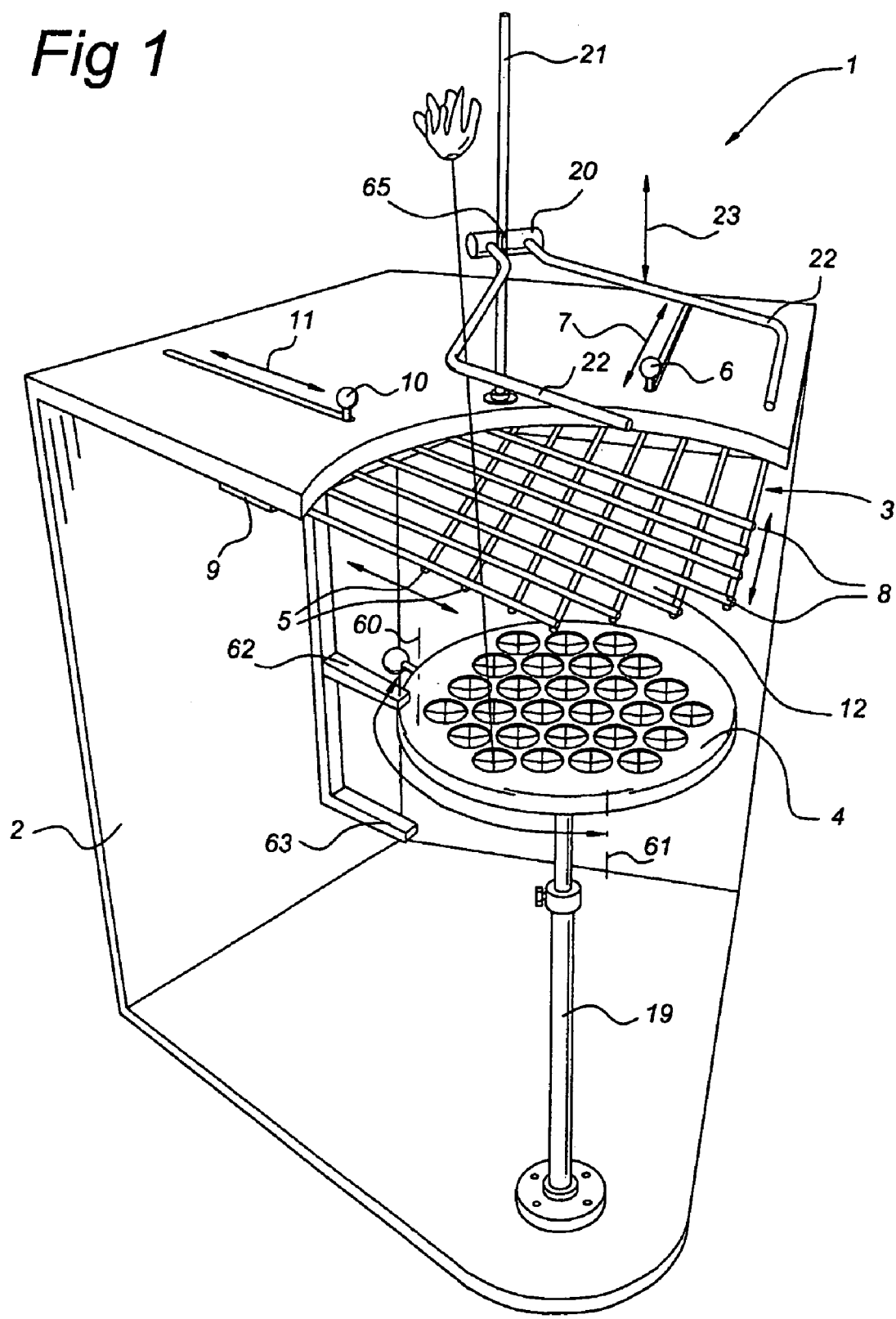
FIG. 1 shows a diagrammatic, perspective view of a flower arranging device according to the invention.

With reference to FIG. 1, the flower arranging device 1 according to the invention comprises a frame 2 that supports the top grating 3 at a fixed vertical height with respect to the frame and further comprises a bottom grating 4. The top grating 3 is made up of a first multiplicity, in this case seven, bars 5 which run parallel to one another and are fixed to a common support, which is not visible in FIG. 1, which support can be moved back and forth in accordance with arrow 7 in the longitudinal direction of the bar axes of the bars 5 by means of a button 6. The top grating 3 furthermore comprises a second multiplicity, in this case seven, of mutually parallel bars 8, which are fixed to a common support 9 which can be moved back and forth in the direction of double-headed arrow 11 by means of a button 10.

The bar axes of the bars 5 and 7 intersect, for example at an angle that does not equal 90°. The reason for this is that this makes a more compact construction of the flower arranging device possible. However, completely within the scope of the invention, the bars 5 and 7 can also very well intersect at an angle of 90°.

Figure 2:
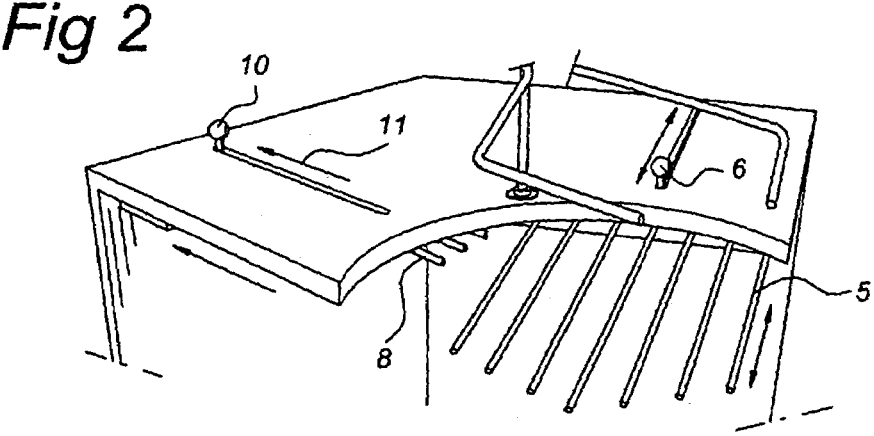
FIG. 2 shows a diagrammatic, perspective view of a detail of the top grating.

FIG. 2 shows, diagrammatically, a view of the top grating, where the second multiplicity of bars 8 have been placed in a so-called release position, in which said bars 8 do not intersect the bar axes of the bars 5 or are located beyond the range of the bar axes of the bars 5 of the first multiplicity of bars. In FIG. 2 the first multiplicity of bars is shown in the so-called grating position and can also be brought [lacuna] the release position by moving the button 6. As will be clear, the second multiplicity of bars 8 can be moved from the release position into a grating position by moving the button 10 in the direction opposed to that of arrow 11 in FIG. 2. When both multiplicities of bars 5 and 8 are in the grating position these bars 5 and 8 together define grating openings 12.

Figure 3:
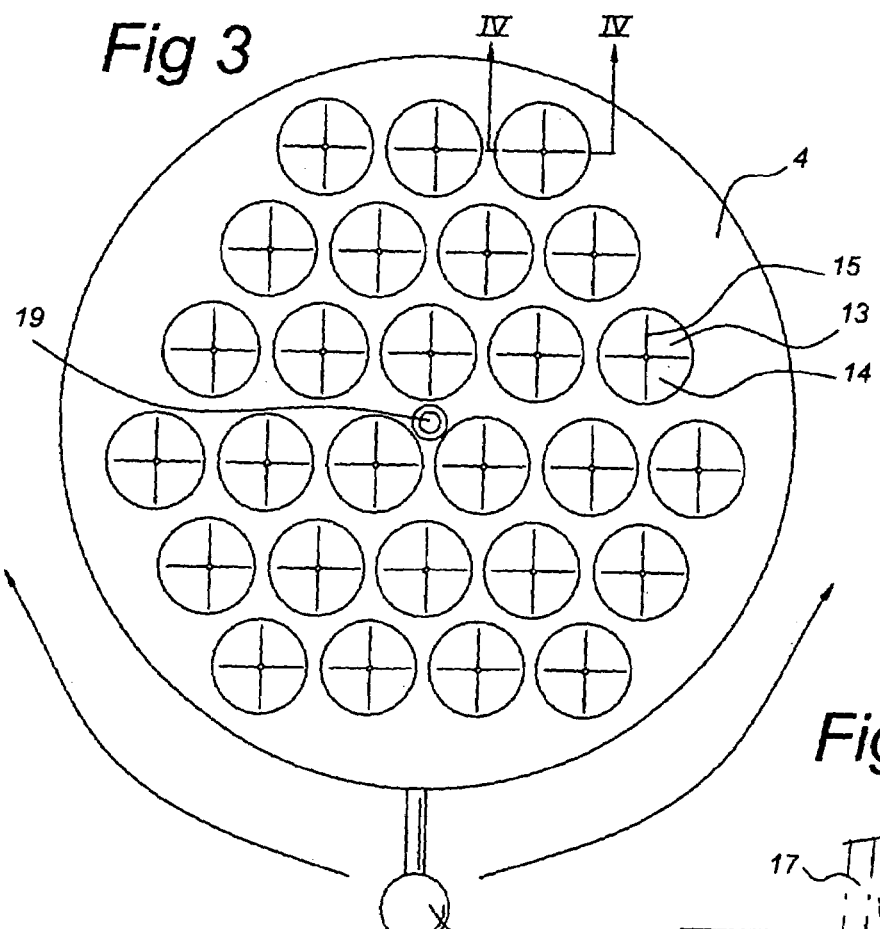
FIG. 3 shows a diagrammatic plan view of the bottom grating of the flower arranging device according to the invention.
Figure 4:
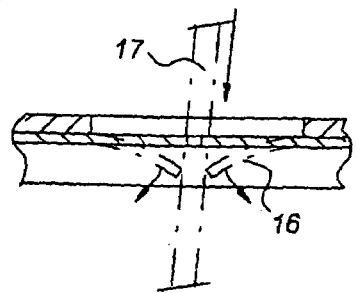
FIG. 4 shows a detail view of a grating opening in the bottom grating of a flower arranging device according to the invention.
Figure 5:
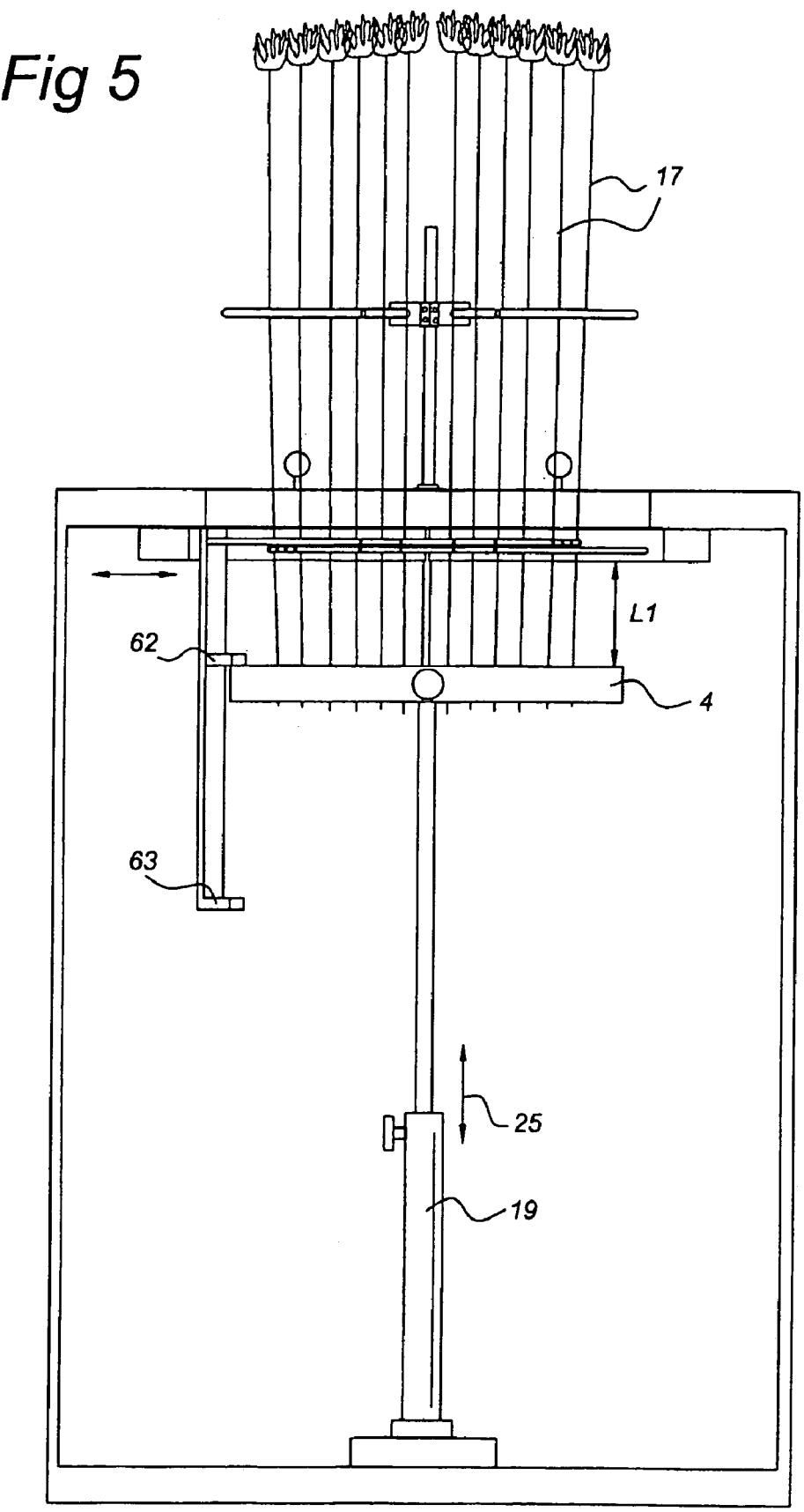
FIGS. 5–8 show, diagrammatically, various steps in the use of the flower arranging device according to the invention.

With reference to FIG. 3, the bottom grating 4 in this case consists of a disc with grating openings 13 made therein. The grating openings 13 are each filled with a rubbery, flexible sheet 14 in which a cross-shaped cut 15 has been provided. The cross-shaped cut 15 makes it possible for a stem of a flower or twig to be inserted through the sheet 14, the four quadrants then each forming a lip 16 that is able to bend aside downwards, as is illustrated by broken lines in FIG. 4, in which figure a stem 17 is also indicated by means of broken lines.

The disc 4 can be turned (see arrows in FIGS. (sic) 1 and 3) about the rotary shaft 19 by means of a handle 18. This rotation is preferably limited by two angle stops (indicated diagrammatically by 60 and 61 in FIG. 1). The rotary shaft 19 is furthermore of telescopic construction; see FIG. 1. The telescopic construction of the rotary shaft 19 makes it possible to position the grating 4 just below or even in contact with the grating 3. In this way the insertion of stems, in particular the orienting of the stems, through, successively, the grating openings 12 in the top grating 3 and the grating openings 13 in the bottom grating 4 is appreciably facilitated. So as nevertheless to provide the stems with adequate support during this operation, a support bracket 20 is provided.

The support bracket 20, the height of which is adjustable along a rod 21, is mounted above the top grating 3. The support bracket 20 is made up of two angled arms 22 which, viewed in projection on the plane of the top grating 3, as it were embrace this top grating 3. The stems are then able to bear on the support arms 22. To facilitate removal of a bunch that has been formed from the support bracket 20 it is preferable if at least one and preferably both bracket arms 22 are able to swing outwards in accordance with arrow 23. If the bottom grating has been moved away before twisting the top grating, the arms 22 of the support bracket will be folded back about hinge 65 before twisting to prevent bending and possible snapping of the stems. Swinging outwards can be achieved by making the support arms 22 flexible, but can equally well be achieved by mounting the support arms 22 on hinges.

With reference to FIGS. 5–8, the method to be adopted with the device according to the invention will be discussed stepwise below.

If this has not already been carried out, the first step will be to bring the flower arranging device according to the invention into the starting position. In the starting position the bars 5 and 8 of the top grating 3 are in their so-called grating position and the bottom grating 4 has been raised by means of the telescopic rotary shaft 19 to a short vertical distance L1 away from the top grating. Preferably, each grating opening 14 in the bottom grating is vertically below a grating opening 12 in the top grating.

In a subsequent step, the second step, the stems 17 of the flowers are inserted one by one, or optionally in pairs, through, successively, the grating openings 12 in the top grating and the grating openings 13 in the bottom grating 4. During this operation it is possible for one or more stems to be provided per grating opening in each case and it is also possible not to fill all grating openings with one or more stems. To make it possible for an inexperienced flower arranger to form a pretty bunch of high quality, it is additionally advantageous according to the invention if the grating openings in the bottom and/or the top grating, preferably the grating openings 13 in the bottom grating 4, are provided with a code, for example a colour code. Each code then represents a specific type of flower. Moreover, by this means it is possible to make a large number of uniform bunches, which as far as possible are identical, one after the other.

Figure 6:
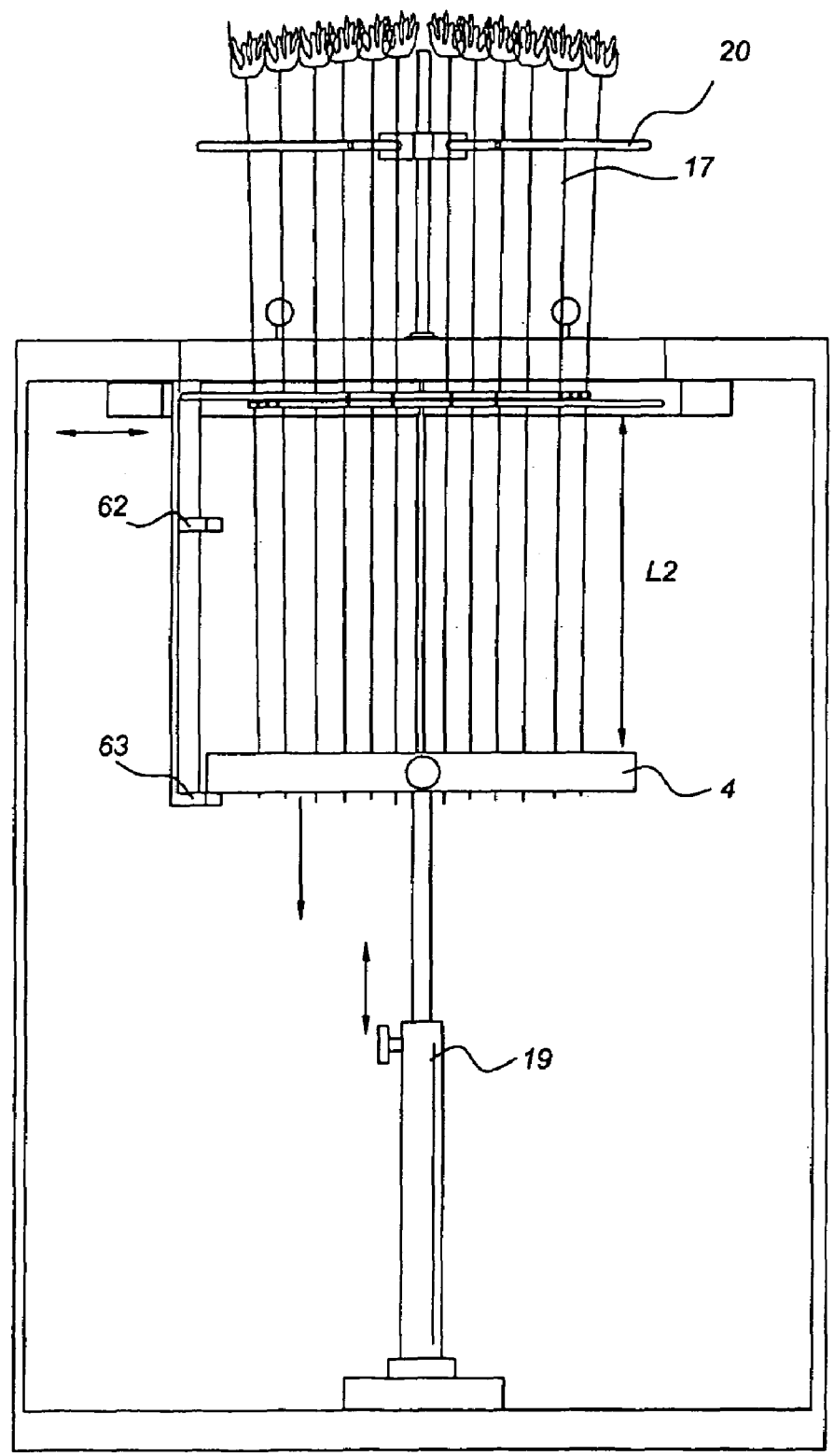

When the gratings have been filled, or at least sufficiently filled, with stems for a bunch to be formed, the bottom grating 4 will be lowered into the position shown in FIG. 6. It is pointed out that it is also very readily conceivable to insert the stems 17 through both gratings when the two gratings are in the position in which they have been placed apart by a distance L2 as shown in FIG. 6. However, the orienting of the stems will then be somewhat less easy.

In a subsequent step the support bracket 20, if present, will preferably first be opened or the bracket arms swung aside before the gratings are turned relative to one another.

Figure 7:
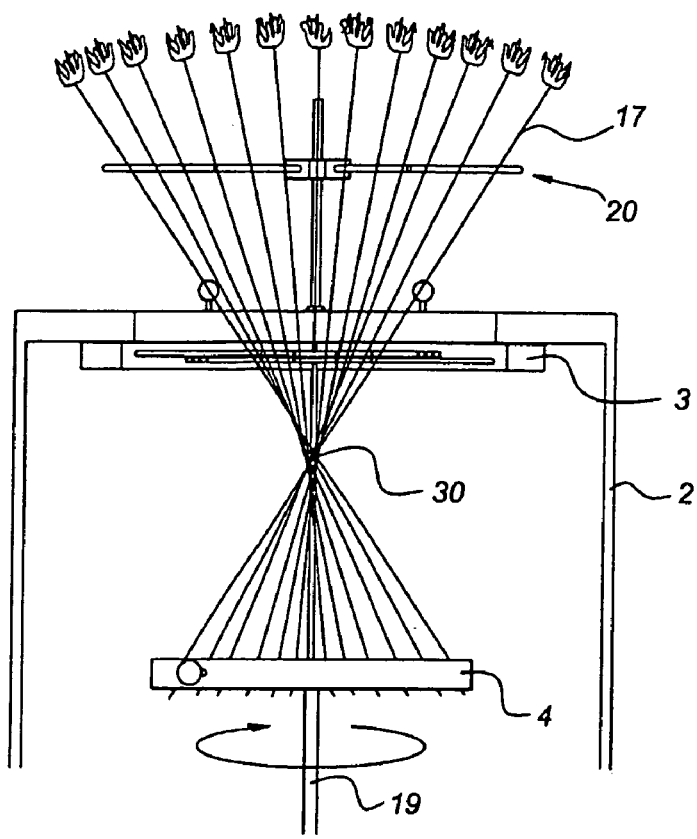
Figure 8:
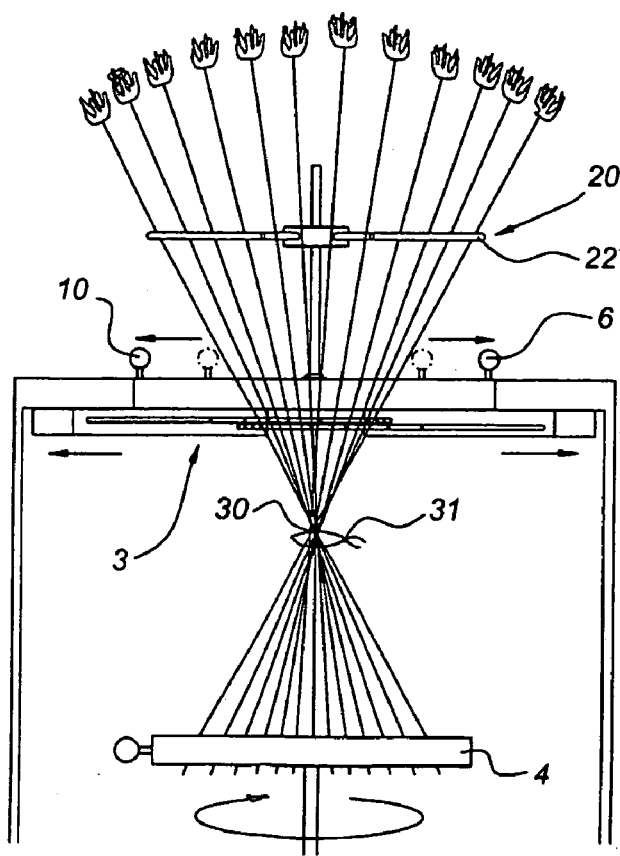

In a subsequent step, see FIG. 7, the gratings 3 and 4 are turned relative to one another about the shaft 19. This turning is effected through an angle determined by adjustable stops 60, 61, which determined angle will be dependent on the type of bunch as well as the distance L2 between the bottom and the top grating 4 and 3, respectively. A twisted-type bunch, which is also referred to as a wheatsheaf-like bunch, is obtained in this way.

A loop of binding material 31 is then placed around the stems 17 at the location of the constriction 30 (FIGS. (sic) 7 and 8). The constriction 30 will be located approximately midway between the gratings 3 and 4. It is pointed out that it is possible, although less practical, first completely to remove the as it were twisted bunch from the flower arranging device 1 and only then to bind it with a loop of binding material 31.

In a finishing step it is then possible, if this has not already been carried out, to apply a loop of binding material 31 at the location of the constriction 30 to hold the bunch in its twisted/wheatsheaf-like position. It is also possible to trim the bottoms of the stems 17 to the same height, if desired. This trimming can optionally already be done in the flower arranging device according to the invention. For this purpose the flower arranging device can be provided with cutting means mounted thereon.

From the ergonomic standpoint and with a view to a clear view of the work, it is preferable if the flower arranging device according to the invention is set up in a such a way that the flower arranger looks obliquely downwards onto the crown of the bunch. The corollary of this is that the top grating 3 will be arranged approximately level with the flower arranger's stomach.

For stable support of the stems, in particular after turning the gratings relative to one another, it is advantageous if the corner points of the diamond-shaped grating openings 12 in the top grating 3 are so oriented that there are two opposing corner points which face in opposing tangential directions with respect to the rotary shaft 19.

Figure 9:
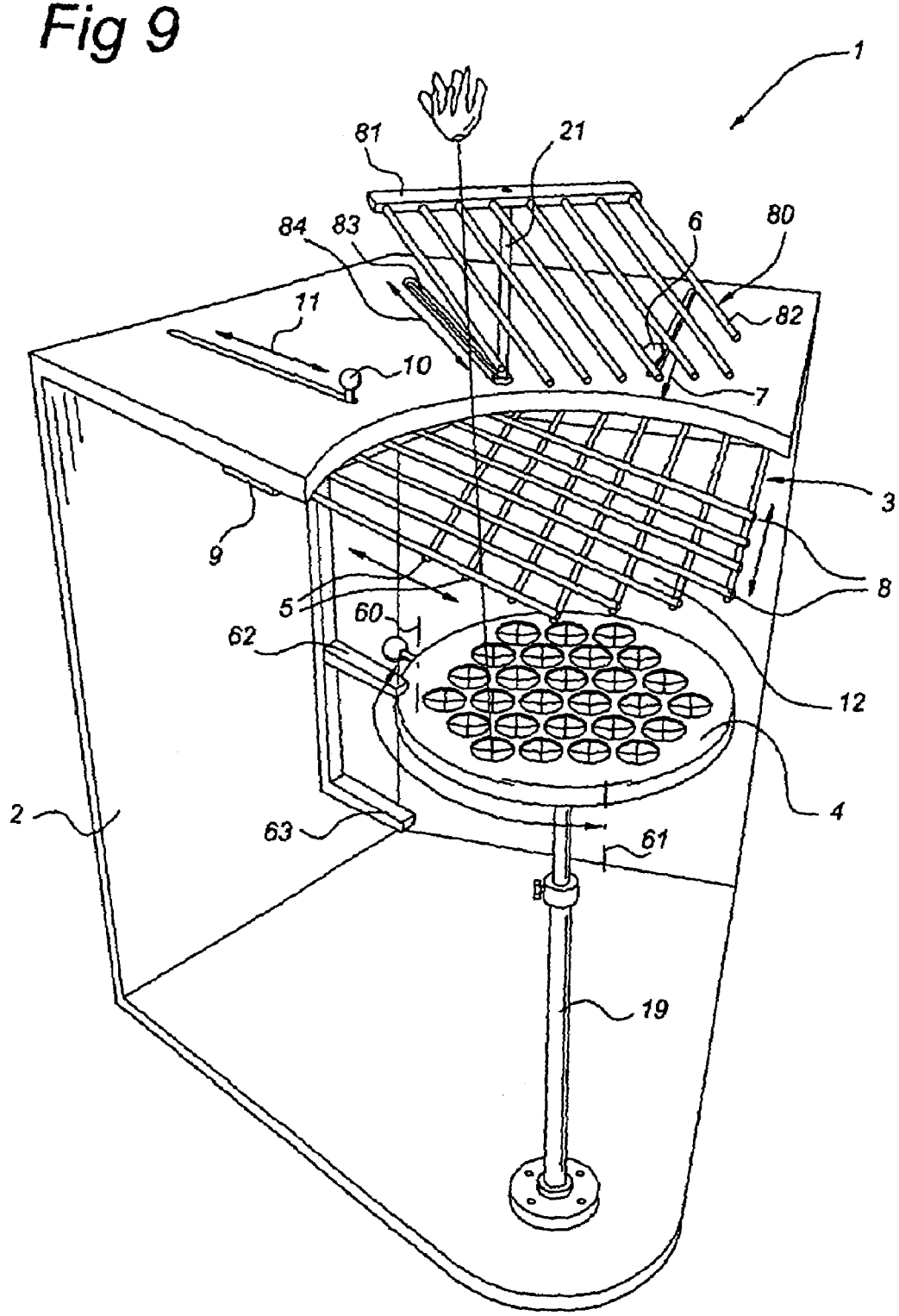
FIG. 9 shows a diagrammatic, perspective view of a variant of the flower arranging device from FIG. 1.

FIG. 9 shows a variant of FIG. 1. The same references and arrows have been used for, respectively, the same components and movements. The variant according to FIG. 9 differs from that according to FIG. 1 in respect of the support means. The support bracket 20, 22 in FIG. 1 has been replaced by a support fork 80 in FIG. 9. The support fork 80 consists of a base 81 to which a multiplicity of mutually parallel times 82 are fixed. The times 82 extend essentially parallel to the top 3 and the bottom 4 grating. The base 81 of the fork 80 is fixed to a vertical pin 21. This vertical pin 21 can be raised and lowered in the vertical direction, by means of means which are not shown, to be able to adjust the vertical height of the fork 80 with respect to the bottom and/or the top grating. The pin 21 can be moved back and forth in the horizontal direction via the slot 83 to enable the fork 80 to be moved between a position overlapping the bottom and/or the top grating and a position located completely to the side of the bottom and/or the top grating. When arranging, in particular positioning, the stems/flowers, the fork 80 will initially be in a high position to provide support for the stems/flowers. To prevent the stems/flowers becoming trapped in the times 82 of the fork 80 when the bottom grating 4 is lowered vertically, it is highly advantageous if the fork 80 is then also lowered. So that the lateral support of the flowers/stems is properly guaranteed during the lowering, it is preferable if the fork 80 moves downwards simultaneously with the bottom grating 4. After the fork 80 and the bottom grating 4 have moved downwards, the fork 80 will be retracted towards the rear in the direction of arrow 84.

The invention claimed is:

1. A flower arranging device for arranging a bunch of flowers, comprising:
   a top grating having top grating openings; and
   a bottom grating, having bottom grating openings located a vertical distance below the top grating, wherein the top grating includes a first multiplicity of mutually parallel bars each having a first bar axis as well as a second multiplicity of mutually parallel bars each having a second bar axis, wherein the first and second bar axes intersect one another, wherein the first multiplicity of bars are configured to be moved back and forth in the direction of the first bar axes between a grating position intersecting the second bar axes and a release position located to the side of the second bar axes, wherein the bottom grating and top grating are configured to be turned relative to one another about a vertical axis of rotation which intersects said two gratings essentially vertically when the gratings are positioned one above the other.

2. The flower arranging device according to claim 1, wherein the extent to which the gratings can be turned is limited by angle stops and wherein at least one of said angle stops is adjustable.

3. The flower arranging device according to claim 1, wherein the second multiplicity of bars are configured to be moved back and forth in the direction of the second bar axes between a grating position that intersects the first bar axes and a release position located to the side of the first bar axes.

4. The flower arranging device according to claim 3, wherein the height of the bottom grating is adjustable along the axis of rotation.

5. The flower arranging device according to claim 4, wherein the height is limited by slide stops, wherein at least one of said slide stops is adjustable.

6. The flower arranging device according to claim 1, wherein the vertical distance between the bottom and the top grating is adjustable.

7. The flower arranging device according to claim 1, further comprising a support bracket having two bracket arms above the top grating, wherein the two bracket arms essentially embrace the top grating, thereby causing the bracket arms to be in an embracing position.

8. The flower arranging device according to claim 7, wherein at least one of the bracket arms is configured to move between said embracing position and a non-embracing position.

9. The flower arranging device according to claim 1, further comprising a support fork above the top grating, wherein the support fork includes parallel times which extend parallel to the top grating, wherein the support fork is configured to move back and forth in the longitudinal direction of the times between a position overlapping one of the bottom and the top grating and a release position located to the side of one of the bottom and the top grating.

10. The flower arranging device according to claim 9, wherein the vertical distance between the support fork and the top grating is adjustable.

11. The flower arranging device according to claim 10, wherein the flower arranging device is configured to reduce the vertical distance between the support fork and the top grating simultaneously while increasing the vertical distance between the bottom and the top grating.

12. The flower arranging device according to claim 1, wherein the number of top grating openings is equal to the number of bottom grating openings.

13. The flower arranging device according to claim 12, wherein the bottom and top grating openings include a same pattern.

14. The flower arranging device according to claim 1, wherein the bottom grating is provided with support means for flower stems, wherein the support means hold the flower stems at a fixed specific height.

15. The flower arranging device according to claim 14, wherein the support means comprise resistance means, selected from one of brushes, leaf springs, or sheet parts provided with slits, wherein the resistance means are provided in one of the grating openings in the bottom grating and at least surrounding the passages of said grating openings, whereby the resistance means are configured to laterally grip a stem inserted through the grating opening.

16. The flower arranging device according to claim 14, further comprising binding means equipped to provide a closed loop of binding material running around the bunch of flowers extending through the gratings.

17. A method for arranging a bunch of flowers, the method comprising the steps of:

providing a top grating having top grating openings;
providing a bottom grating having bottom grating openings located a vertical distance below the top grating, wherein the top grating includes a first multiplicity of mutually parallel bars each having a first bar axis as well as a second multiplicity of mutually parallel bars each having a second bar axis, wherein the first and second bar axes intersect one another, wherein the first multiplicity of bars are configured to be moved back and forth in the direction of the first bar axes between a grating position intersecting the second bar axes and a release position located to the side of the second bar axes, wherein the bottom grating and top grating are configured to be turned relative to one another about a vertical axis of rotation which intersects said two gratings essentially vertically when the gratings are positioned one above the other;
inserting one of flower and plant stems through the grating openings located one above the other;
turning the bottom and top gratings relative to one another;
providing a closed loop of binding material running around the stems of the bunch of flowers between the bottom and the top grating;
moving the first multiplicity of bars of the top grating from the grating position into the release position and optionally moving the second multiplicity of bars of the top grating from the grating position into the release position; and
removing the twisted bunch of flowers formed.

18. The method according to claim 17, whereby the insertion step is carried out with a relatively small grating spacing and the relatively small grating spacing is increased to a relatively large grating spacing before the turning step.

* * * * *